United States Patent
Thomas

(10) Patent No.: US 8,943,924 B2
(45) Date of Patent: Feb. 3, 2015

(54) SYSTEM AND METHOD FOR AN ADJUSTABLE LEVER ASSEMBLY

(75) Inventor: John Larry Thomas, Cedarburg, WI (US)

(73) Assignee: HB Performance Systems, Inc., Mequon, WI (US)

( * ) Notice: Subject to any disclaimer, the term of this patent is extended or adjusted under 35 U.S.C. 154(b) by 932 days.

(21) Appl. No.: 12/954,449

(22) Filed: Nov. 24, 2010

(65) Prior Publication Data

US 2012/0125143 A1 May 24, 2012

(51) Int. Cl.
*G05G 1/04* (2006.01)

(52) U.S. Cl.
CPC .......................................... *G05G 1/04* (2013.01)
USPC ................ 74/522; 188/26; 188/344

(58) Field of Classification Search
CPC ............. B62L 3/00; B62L 3/02; B62L 3/023; B62L 3/026; B62L 3/06; B62K 23/02; B62K 23/06; B62M 25/02; B62M 25/04; B60T 7/08
USPC .......... 74/488, 489, 473.14, 473.15, 522, 525; 403/118, 342, 343; 188/24.22, 26, 344
See application file for complete search history.

(56) References Cited

U.S. PATENT DOCUMENTS

| | | |
|---|---|---|
| 2,163,874 A | 6/1939 | Goepfrich |
| 3,039,269 A | 6/1962 | Hill |
| 3,378,116 A | 4/1968 | Hennig |
| 3,915,461 A | 10/1975 | Gautier |
| 4,050,251 A | 9/1977 | Carre et al. |
| 4,156,532 A | 5/1979 | Kawaguchi et al. |
| 4,175,648 A | 11/1979 | Sule |
| 4,318,307 A | 3/1982 | Kine |
| 4,387,901 A | 6/1983 | Ritsema |
| 4,492,082 A | 1/1985 | Belart |
| 4,772,334 A | 9/1988 | Hatanaka et al. |
| 4,773,224 A | 9/1988 | Sakamoto et al. |
| 4,840,082 A | 6/1989 | Terashima et al. |
| 4,858,437 A | 8/1989 | Ochiai |

(Continued)

FOREIGN PATENT DOCUMENTS

| | | |
|---|---|---|
| DE | 3932248 A1 | 4/1990 |
| DE | 4223353 A1 | 1/1994 |

(Continued)

OTHER PUBLICATIONS

Hope X2 caliper brake pad; Hayes Bicycle Group; 1 page; available at least as early as Oct. 2008.

*Primary Examiner* — James Pilkington
*Assistant Examiner* — Brian McGovern
(74) *Attorney, Agent, or Firm* — Whyte Hirschboeck Dudek S.C.

(57) ABSTRACT

Disclosed herein is an adjustable lever assembly with a lever having an adjustment section and a grip section, where the adjustment section includes a slide passage in communication with an adjuster passage, and an adjuster positioned at least partially inside the adjuster passage, the adjuster having a threaded inner passage extending therethrough. The adjustable lever assembly further includes a slide positioned substantially inside the slide passage, the slide including an outer wall surface that is keyed to the slide passage and a threaded outer portion for rotatably engaging the threaded inner passage of the adjuster, wherein rotation of the adjuster translates the slide about the adjuster passage, and wherein the slide includes a bottom portion configured for securing pivotally to a pushrod.

19 Claims, 5 Drawing Sheets

(56) References Cited

U.S. PATENT DOCUMENTS

| | | | |
|---|---|---|---|
| 4,885,910 | A | 12/1989 | Resch |
| 4,903,540 | A | 2/1990 | Beauch |
| 4,939,901 | A | 7/1990 | Saalbach et al. |
| 5,111,661 | A | 5/1992 | Savidan et al. |
| 5,161,375 | A | 11/1992 | Crumb et al. |
| 5,179,834 | A | 1/1993 | Rauschenbach |
| 5,195,322 | A | 3/1993 | Bergelin et al. |
| 5,261,375 | A | 11/1993 | Rush, II et al. |
| 5,275,085 | A | 1/1994 | Hur |
| 5,325,940 | A | 7/1994 | Rueckert et al. |
| 5,390,771 | A | 2/1995 | Hinkens et al. |
| 5,417,067 | A | 5/1995 | Nevitt |
| 5,473,896 | A | 12/1995 | Bergelin et al. |
| 5,515,743 | A * | 5/1996 | Lumpkin ............... 74/502.2 |
| 5,535,590 | A | 7/1996 | Nies |
| 5,615,754 | A | 4/1997 | Kobayashi et al. |
| 5,636,517 | A | 6/1997 | Mallmann |
| 5,636,518 | A | 6/1997 | Burgoyne et al. |
| 5,826,681 | A | 10/1998 | Kubo et al. |
| 5,839,544 | A | 11/1998 | Yamashita |
| 6,003,639 | A | 12/1999 | Buckley et al. |
| 6,044,936 | A | 4/2000 | Matsumoto et al. |
| 6,161,448 | A * | 12/2000 | Wang ..................... 74/502.2 |
| D437,813 | S | 2/2001 | Terasawa |
| 6,230,849 | B1 | 5/2001 | Lumpkin |
| 6,244,393 | B1 | 6/2001 | Weidenweber et al. |
| 6,318,514 | B1 | 11/2001 | Hinkens et al. |
| 6,347,689 | B1 | 2/2002 | Ohishi |
| 6,401,882 | B1 | 6/2002 | Ueda et al. |
| 6,425,464 | B2 | 7/2002 | Lumpkin et al. |
| 6,431,327 | B1 | 8/2002 | Lumpkin |
| 6,434,931 | B1 | 8/2002 | Shaw et al. |
| 6,457,378 | B2 | 10/2002 | Hatakoshi et al. |
| 6,494,040 | B2 | 12/2002 | Pagot et al. |
| 6,607,057 | B2 | 8/2003 | Lumpkin et al. |
| 6,769,254 | B2 | 8/2004 | Heller et al. |
| 6,804,961 | B2 | 10/2004 | Lumpkin |
| 6,837,048 | B2 | 1/2005 | Pietsch et al. |
| 6,883,647 | B1 | 4/2005 | Wen |
| 6,945,369 | B1 | 9/2005 | Chen |
| 6,957,534 | B2 | 10/2005 | Lumpkin |
| D512,667 | S | 12/2005 | Iwasaki |
| 7,007,776 | B1 | 3/2006 | Lin |
| D522,422 | S | 6/2006 | Campbell et al. |
| D527,321 | S | 8/2006 | Gherardi et al. |
| 7,086,229 | B2 | 8/2006 | Mallmann et al. |
| 7,121,094 | B2 | 10/2006 | Nohira |
| 7,204,350 | B2 | 4/2007 | Lumpkin |
| D548,656 | S | 8/2007 | Hanamura |
| 7,331,433 | B2 | 2/2008 | Okabe |
| D570,272 | S | 6/2008 | Jones et al. |
| D573,069 | S | 7/2008 | Jones |
| D573,926 | S | 7/2008 | Jones |
| D573,927 | S | 7/2008 | Jones |
| D574,306 | S | 8/2008 | Jones |
| D575,703 | S | 8/2008 | Jones |
| D576,089 | S | 9/2008 | Jones |
| 7,530,435 | B2 | 5/2009 | Lumpkin |
| 7,540,147 | B2 | 6/2009 | Takizawa et al. |
| 7,546,909 | B2 | 6/2009 | Campbell et al. |
| 7,575,105 | B2 | 8/2009 | Lumpkin |
| 7,617,913 | B2 | 11/2009 | Lumpkin |
| D608,259 | S | 1/2010 | Becocci |
| 7,654,171 | B2 | 2/2010 | Wen |
| 7,654,366 | B2 | 2/2010 | Matsushita |
| 7,857,112 | B1 * | 12/2010 | Tsai et al. ................ 188/344 |
| 2002/0100276 | A1 | 8/2002 | Petin |
| 2003/0155192 | A1 | 8/2003 | Tsai |
| 2004/0200674 | A1 | 10/2004 | Campbell |
| 2005/0173215 | A1 | 8/2005 | Watarai et al. |
| 2006/0070483 | A1 | 4/2006 | Dimsey |
| 2007/0144836 | A1 | 6/2007 | Kunstle et al. |
| 2007/0283774 | A1 * | 12/2007 | Lavezzi et al. ................ 74/40 |
| 2008/0053758 | A1 | 3/2008 | Ruckh et al. |
| 2008/0060885 | A1 | 3/2008 | Ruckh et al. |
| 2008/0116025 | A1 | 5/2008 | Lumpkin |
| 2008/0155982 | A1 | 7/2008 | Jones et al. |
| 2008/0229863 | A1 | 9/2008 | Orrico et al. |
| 2008/0251334 | A1 | 10/2008 | Takizawa et al. |
| 2009/0255769 | A1 | 10/2009 | Kurita |
| 2009/0272606 | A1 | 11/2009 | Chelaidite et al. |
| 2009/0301252 | A1 * | 12/2009 | Hsu ................................ 74/489 |
| 2010/0051400 | A1 | 3/2010 | Yang |

FOREIGN PATENT DOCUMENTS

| | | | |
|---|---|---|---|
| DE | 10038892 | A1 | 3/2002 |
| DE | 102006004210 | A1 | 8/2007 |
| EP | 1179686 | A2 | 2/2002 |
| FR | 2134082 | A1 | 12/1972 |
| JP | 3031054 | A1 | 2/1991 |
| JP | 2002031174 | A1 | 1/2002 |
| WO | 02058988 | A1 | 8/2002 |
| WO | 2007085487 | A1 | 8/2007 |

* cited by examiner

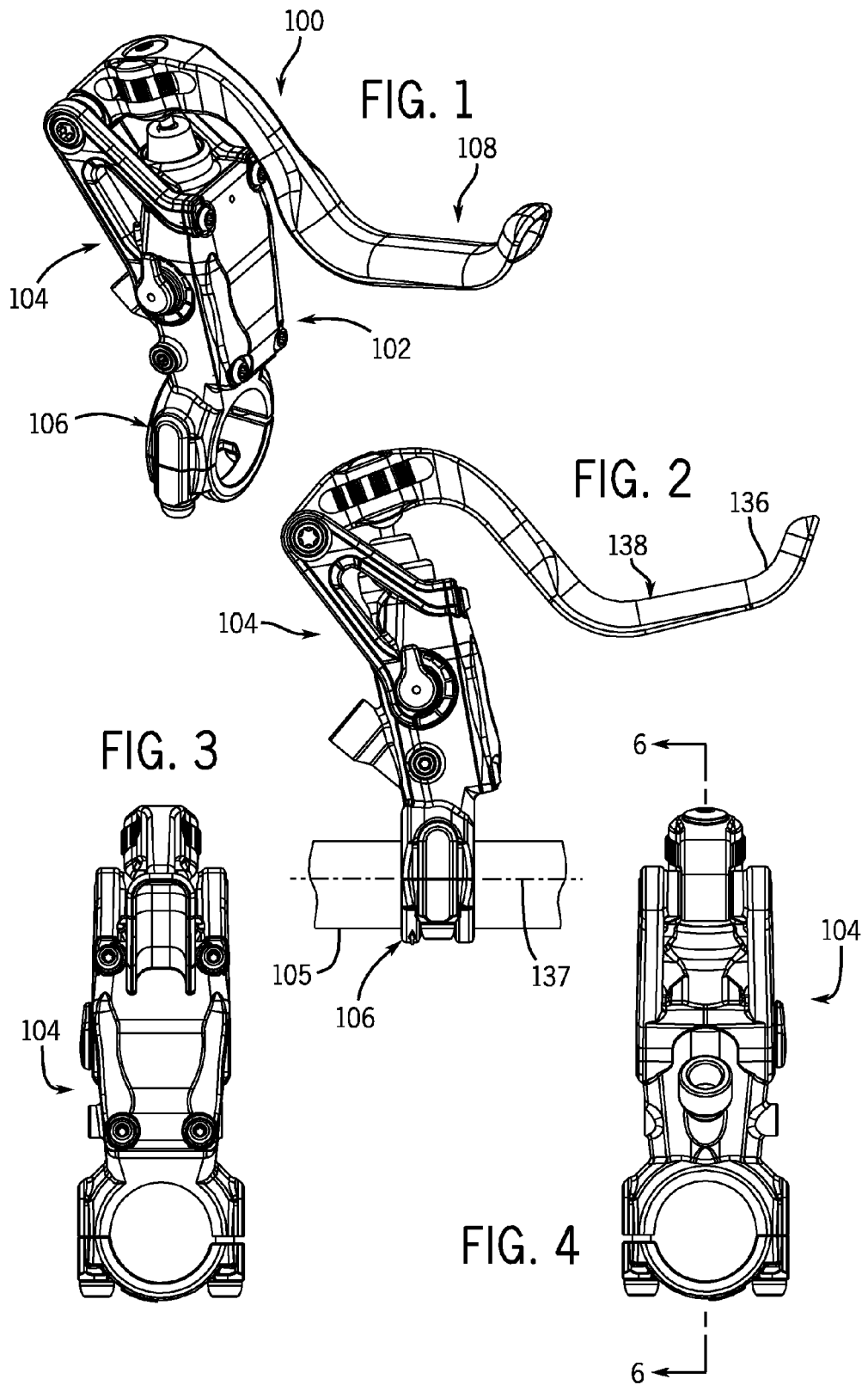

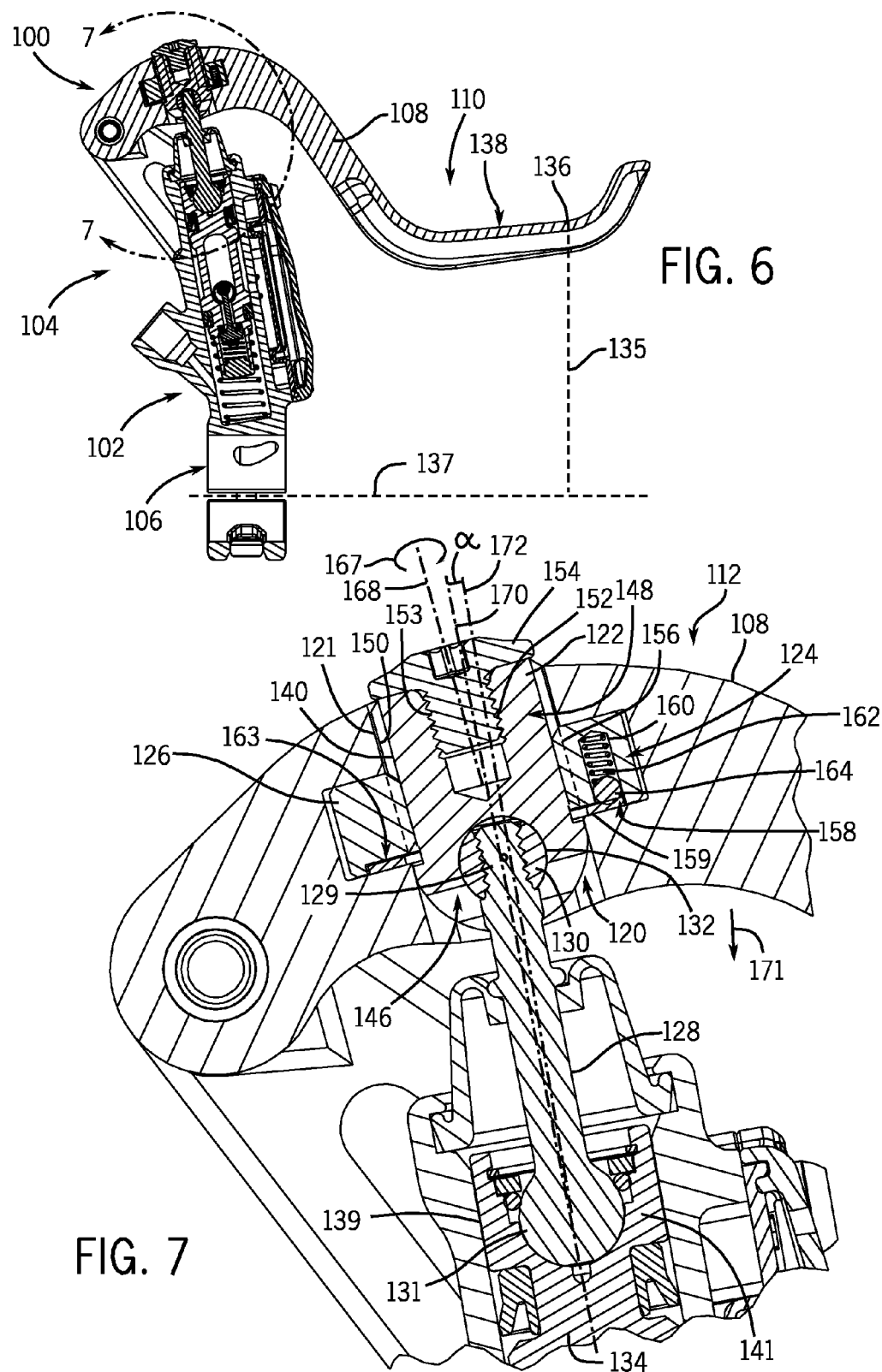

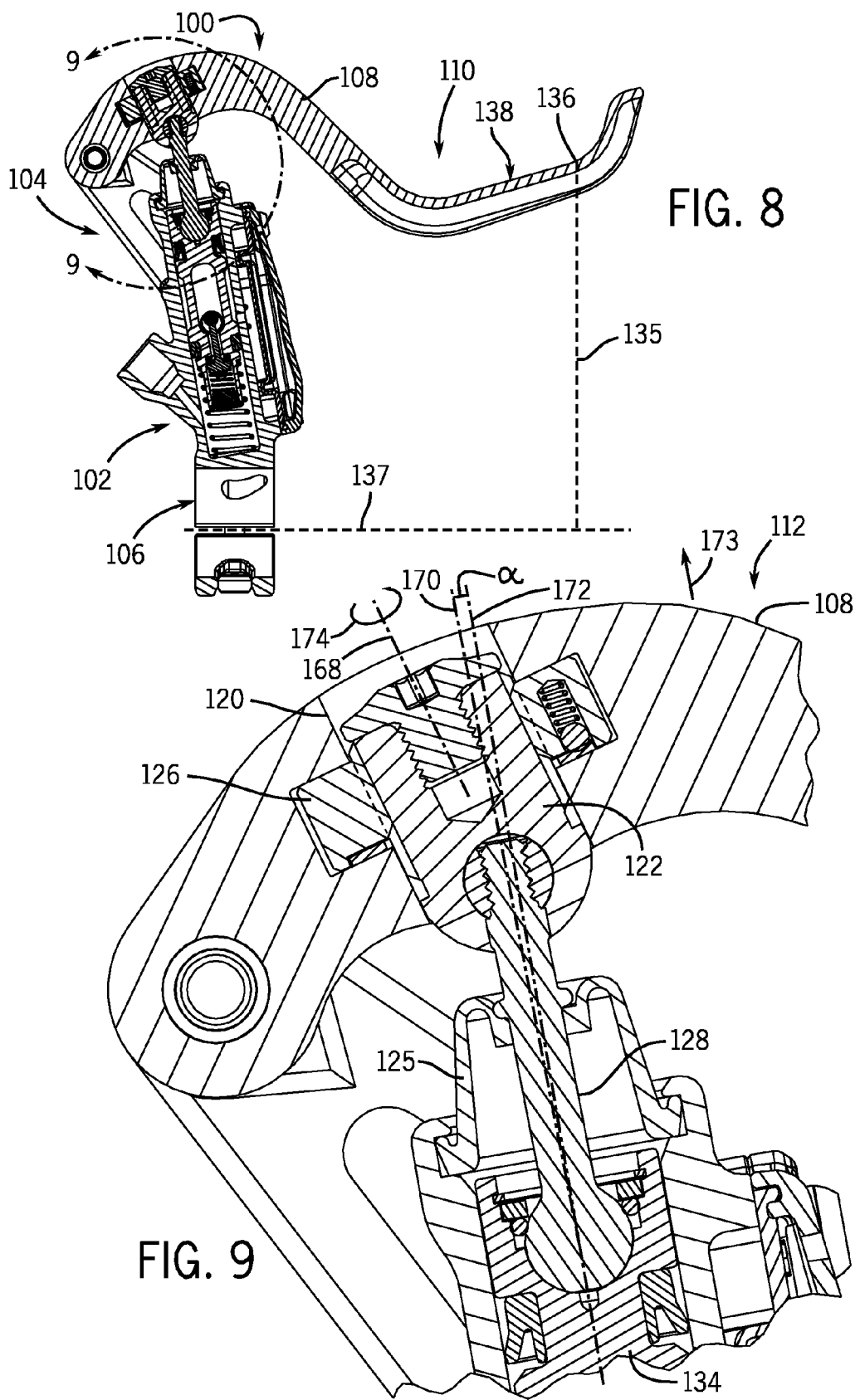

SYSTEM AND METHOD FOR AN ADJUSTABLE LEVER ASSEMBLY

CROSS-REFERENCE TO RELATED APPLICATION

This application hereby incorporates herein by reference U.S. application Ser. No. 12/954,301 entitled "Method and Apparatus for Lever Stroke Adjustment," filed Nov. 24, 2010.

FIELD OF THE INVENTION

The present invention relates to lever assemblies and, more particularly to systems and methods for adjusting a lever position.

BACKGROUND OF THE INVENTION

Numerous types of vehicles, such as bicycles, All-Terrain Vehicles (ATV) and motorcycles, utilize a handlebar mounted lever assembly to actuate a braking and/or clutch system. Such actuating lever assemblies include a lever that is positioned about the handlebar so as to allow a user to reach forward from the handlebar with their fingers and grasp the lever. Pulling the lever toward the handlebar with their fingers provides actuation to the braking or clutch system connected to the lever.

To accommodate users having different finger lengths and strengths, as well as different driving styles, braking and clutch systems can provide a lever adjusting mechanism, such as a variable length pushrod that provides translation of the lever closer to or farther away from the handlebar (i.e., reach adjustment). These systems can provide a desired translation of the lever, but as a result, such adjustments can modify other operating characteristics of the lever relative to the braking and clutch systems. For example, adjusting a variable length pushrod on a lever mechanism can significantly modify the "lever ratio," which thereby increases the amount of actuation force that is required by the user.

BRIEF SUMMARY OF THE INVENTION

In at least some embodiments, an adjustable lever assembly is provided that includes a lever having an adjustment section and a grip section, where the adjustment section includes a slide passage in communication with an adjuster passage, and an adjuster positioned at least partially inside the adjuster passage, the adjuster having a threaded inner passage extending therethrough. The adjustable lever assembly further includes a slide positioned substantially inside the slide passage, the slide including an outer wall surface that is keyed to the slide passage and a threaded outer portion for rotatably engaging the threaded inner passage of the adjuster, wherein rotation of the adjuster translates the slide about the adjuster passage, and wherein the slide includes a bottom portion configured for securing pivotally to a pushrod.

In other embodiments, an adjustable master cylinder lever assembly is provided that includes, a master cylinder body, a lever pivotably secured to the master cylinder body, the lever having an adjustment section and a grip section, where the grip section includes a lever finger contact portion and the adjustment section includes a slide passage in communication with an adjuster passage and an adjuster positioned substantially inside the adjuster passage, having an outer surface and a threaded inner passage extending therethrough. The adjustable master cylinder lever assembly further includes, a piston situated inside the master cylinder body, the piston having a piston upper portion and a central piston axis extending longitudinally through the piston, and a fixed length pushrod having a pushrod first end and a pushrod second end, the pushrod including a central pushrod axis extending longitudinally through the pushrod, wherein the pushrod second end is in operable communication with the piston upper portion. In addition, the adjustable master cylinder lever assembly includes a slide positioned substantially inside the slide passage, where the slide includes an outer wall surface that is keyed to the slide passage to substantially prevent rotation therein, the slide having a threaded outer portion for matingly engaging the threaded inner passage of the adjuster, and a bottom portion operably secured to the pushrod first end, and wherein the master cylinder body includes a clamp having a clamp centerline, where rotation of the adjuster varies the distance between the lever finger contact portion and the clamp centerline.

In still other embodiments, an adjustable lever assembly is provided that includes a lever having an adjustment section and a grip section, where the adjustment section includes a slide passage in communication with and substantially perpendicular to an adjuster passage, wherein the slide passage includes an inner wall surface with an oblong circumference, and a spring biased cylindrical adjuster knob positioned substantially inside the adjuster passage, the adjuster knob including a textured outer surface protruding at least partially outside the adjuster passage and a threaded inner passage extending therethrough, wherein the adjuster knob includes a spring passage for receiving a spring and a ball for biasing the adjuster knob in a set position. Additionally, the adjustable lever assembly includes a slide positioned substantially inside the slide passage, where the slide includes a slide outer wall surface that is keyed to the inner wall surface of the slide passage to substantially limit rotation of the slide with respect to the slide passage, the slide including a threaded portion for matingly engaging the threaded inner passage of the adjuster knob and a bottom portion that includes a bushing passage. In addition, the adjustable lever assembly includes a pushrod having a longitudinal center pushrod axis and the pushrod is connected to a rotatable bushing situated in the bushing passage, the rotatable bushing including a central bushing axis extending longitudinally, wherein the push rod pivots about the bushing axis. Further, the adjustable lever assembly includes a detent plate positioned adjacent the adjuster knob, the detent plate having an outer circumference that includes a plurality of detents sized to receive at least a portion of the ball therein, and an inner detent passage that is shaped to substantially correspond to the slide wall outer surface to allow for movement of the slide therethrough and to prevent rotation of the detent plate relative to the slide.

In still yet other embodiments, a method of adjusting a lever is provided, the method including, rotating an adjuster knob situated in a lever pivotally connected to a master cylinder fulcrum, the adjuster knob threadingly engaged to a keyed slide positioned in a slide passage, and upon rotation of the adjuster knob, sliding the keyed slide through the slide passage, thereby rotating the lever about the fulcrum, and pivoting a pushrod interconnected between the slide and a piston during rotation of the adjuster knob, wherein the pushrod has a center pushrod axis extending longitudinally and the piston has a center piston axis extending longitudinally.

Other embodiments, aspects, features, objectives and advantages of the present invention will be understood and appreciated upon a full reading of the detailed description and the claims that follow.

BRIEF DESCRIPTION OF THE DRAWINGS

Features of the system and method for an adjustable lever assembly which are believed to be novel are set forth with particularity in the appended claims. Embodiments of the system and method for an adjustable lever assembly are disclosed with reference to the accompanying drawings and are for illustrative purposes only. The system and method for an adjustable lever assembly is not limited in its application to the details of construction or the arrangement of the components illustrated in the drawings. Rather, the system and method for an adjustable lever assembly is capable of other embodiments or of being practiced or carried out in other various ways. In the drawings:

FIG. 1 is a perspective view of an exemplary adjustable lever assembly shown in operable association with a brake master cylinder forming a master cylinder lever assembly;

FIG. 2 is a side view of the master cylinder lever assembly of FIG. 1, in accordance with at least some embodiments;

FIG. 3 is a front view of the master cylinder lever assembly of FIG. 1, in accordance with at least some embodiments;

FIG. 4 is a back view of the master cylinder lever assembly of FIG. 1, in accordance with at least some embodiments;

FIG. 6 is a cross-sectional view of the master cylinder lever assembly of FIG. 4 at 6-6 depicting the adjustable lever assembly set in a minimum extent position, in accordance with at least some embodiments;

FIG. 7 is an enlarged detail view of a portion of the master cylinder lever assembly of FIG. 6 at 7-7, in accordance with at least some embodiments;

FIG. 8 is a cross-sectional view of the master cylinder lever assembly of FIG. 1, depicting the adjustable lever assembly set in a maximum extent position, in accordance with at least some embodiments;

FIG. 9 is an enlarged detail view of a portion of the master cylinder lever assembly of FIG. 8 at 9-9, in accordance with at least some embodiments;

DETAILED DESCRIPTION OF THE PREFERRED EMBODIMENT

Figure 5:
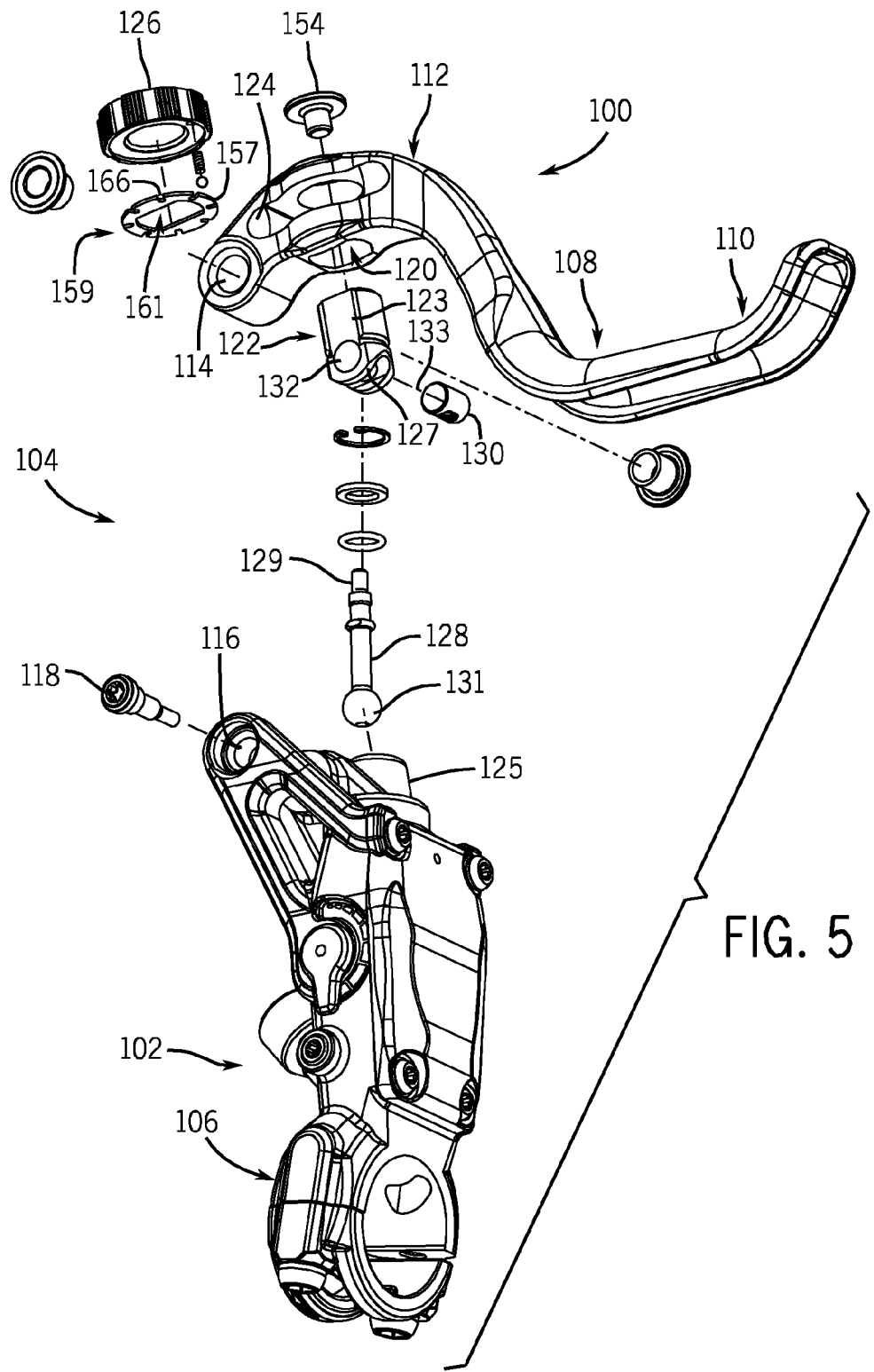
FIG. 5 is an exploded view of the master cylinder lever assembly of FIG. 1, in accordance with at least some embodiments.

Referring to FIGS. 1, 2, 3, and 4, an exemplary adjustable lever assembly 100 is shown in operable association with an exemplary master cylinder 102, to form a master cylinder lever assembly 104, in accordance with at least some embodiments. The master cylinder lever assembly 104 is configured for mounting on a handlebar of a vehicle (not shown) and actuating a system, such as a braking system (not shown) or a clutch system (not shown). Although the master cylinder lever assembly 104 is capable of operating various systems, for exemplary purposes, the master cylinder lever assembly 104 is principally referred to herein as operating in conjunction with a braking system.

The adjustable lever assembly 100 includes a lever 108 for actuating the master cylinder 102. The master cylinder lever assembly 104 is secured to a handlebar 105 using a fastening mechanism, such as a clamp 106. To actuate the braking system, a driver of the vehicle grasps the lever 108 and pulls it toward the handlebar 105, causing the adjustable lever assembly 100 to act on the master cylinder 102, thereby actuating the braking system.

Referring now to FIG. 5, an exploded view of the master cylinder lever assembly 104 is provided, in accordance with at least some embodiments. The lever 108 includes a grip section 110 and an adjustment section 112. The grip section 110 provides a driver with a grasping surface for pulling the lever 108 towards the handlebar 105 for actuation of the braking system. The adjustment section 112 is positioned adjacent a pivot passage 114, and the pivot passage being utilized to pivotally secure the lever 108 to a master cylinder fulcrum 116 using a pivot pin 118. The adjustment section 112 further includes a slide passage 120 for at least partially receiving a slide 122 and an adjuster passage 124 for at least partially receiving an adjuster 126, such as a circular knob. The adjuster passage 124 is positioned substantially perpendicular to and in communication with the slide passage 120. More particularly, at least a portion of the adjuster passage 124 overlaps and/or is coincident with the slide passage 120. The slide 122 and adjuster 126 work in concert to provide reach adjustment for the lever 108.

Further, in accordance with at least some embodiments, the slide 122 is coupled to a pushrod 128 at a slide lower portion 127. The slide lower portion 127 includes a slide bushing passage 132 that receives a rotatable slide bushing 130. The slide bushing 130 is connected to the pushrod first end 129 by a connector, such as a mating threaded engagement therebetween. Additionally, the slide bushing 130 includes a central slide bushing axis 133 extending longitudinally therethrough. In some other embodiments, the slide bushing 130 can be integrally formed with the pushrod first end 129, and in yet other embodiments, the slide 122 can be coupled to the pushrod 128 using other fastening methods, for example, a ball and joint connection.

Referring additionally to FIG. 7, the pushrod 128 also includes a pushrod second end 131. The pushrod second end 131 is in operable communication with a piston upper portion 141 of a piston 134, the piston 134 being situated substantially inside a piston bore 139 that is inside the master cylinder 102, wherein actuation of the pushrod 128 by the lever 108, via the slide 122, provides actuation of the piston 134, thereby applying pressure to actuate the braking system. Additionally, in some embodiments, the pushrod second end 131 is pivotally secured to the piston upper portion 141, although in other embodiments, the pushrod second end 131 actuates the piston upper portion 141 without being secured thereto. Further, in at least one embodiment, the pushrod 128 has a fixed length measured between a center of the pushrod first end 129, which is situated inside the slide bushing 130 and a center of the pushrod second end 131, which is situated inside a portion of the piston 134. In addition, a pushrod boot 125 is provided to seal the piston bore 139 about the pushrod 128.

In addition, adjustment of the adjustable lever assembly 100 provides a "reach adjust," which modifies an adjust distance 135 (see FIG. 6) between a lever finger contact portion 136 of the lever 108 and a clamp centerline 137 (also known as a handlebar centerline). In at least some embodiments, the lever finger contact portion 136 is more particularly defined as a portion along a grip area surface line 138 that is intended for positioning one or more of a driver's fingers used for actuating the lever, while in at least one embodiment the lever finger contact portion 136 is positioned along the grip area surface line 138 about one inch from the end of the lever.

Referring now to FIGS. 6-11, in accordance with at least some embodiments, the adjustable lever assembly 100 provides for numerous lever reach adjustment positions. More particularly, the lever reach adjustment positions can include a neutral position that allows for adjustments in a first direction to a minimum extent position and in a second direction to a maximum extent position. In the minimum extent position, as shown in FIGS. 6 and 7, the adjust distance 135 is shortened as compared to when the lever 108 is in the neutral position (FIGS. 10 and 11), this provides a short reach adjust position that requires less reach to grasp the lever 108. In the maximum extent position, as shown in FIGS. 8 and 9, the adjust distance 135 is lengthened as compared to when the lever 108 is in the neutral position. In this position the longer reach adjust position requires a greater reach to grasp the lever 108. Finally, in FIGS. 10 and 11, the lever is positioned in the neutral position.

Referring additionally to FIG. 6, a cross-sectional view of the master cylinder lever assembly 104 of FIG. 4 at 6-6 is provided, depicting the adjustable lever assembly 100 in a minimum extent position, in accordance with at least some embodiments. FIG. 7 depicts an enlarged detail view of a portion of the master cylinder lever assembly 104 of FIG. 6. As discussed above, the adjustment section 112 of the adjustable lever assembly 100 includes the slide passage 120 and the adjuster passage 124. The slide 122 is configured to be moved along the slide passage 120 by the adjuster 126, which is positioned at least partially inside the adjuster passage 124. The slide passage 120 houses the slide 122, wherein the slide 122 is shaped to substantially conform to the shape of the slide passage 120. More particularly, the slide 122 includes a slide wall outer surface 123 that is keyed to an inner wall surface 121 of the slide passage 120. This allows the slide 122 to move substantially perpendicular to the adjuster 126 with substantially minimal non-perpendicular movement relative to the slide passage 120 and also substantially prevents rotation of the slide 122 in the slide passage 120. The keying, in at least one embodiment, is accomplished by using an oblong-shaped slide and passage, although in other embodiments, other types of keying can be utilized, such as vertical protrusions with mating channels.

In addition, the slide 122 includes a threaded portion 150 positioned substantially between the slide upper section 148 and the lower section 146. The threaded portion 150 includes threads 153 that extend outward from the side portion 140 to about the slide passage 120, as a result, the threads 153 can also serve to substantially limit non-perpendicular movement of the slide 122 with respect to the slide passage 120. In addition, the point where the threads 153 terminate about the lower section 146 can assist to establish the minimum extent stop. Further, the lower section 146 also includes the slide bushing passage 132 for connection with the pushrod 128, as discussed above. In addition, the upper section 148 includes a limit passage 152 for receiving a limit screw 154 therein, where the limit screw 154 is utilized to establish the maximum extent as discussed below.

In at least one embodiment, to facilitate movement of the slide 122, the adjuster 126 includes a threaded inner passage 156 for matingly engaging the threaded portion 150 of the slide 122. Rotation of the adjuster 126 utilizes the threaded engagement between the slide 122 and the adjuster 126 to move the lever finger contact portion 136 of the lever 108 closer to or farther from the clamp centerline 137.

A detent mechanism 158 is provided with the adjuster 126 to limit unattended rotation of the adjuster 126, thereby maintaining the desired position of the slide 122 (i.e., the reach adjustment). In at least one embodiment, the detent mechanism 158 includes a detent plate 159 having a detent passage 161 (see FIG. 5) therethrough that is keyed to the slide wall outer surface 123 to prevent rotation of the detent plate 159 during rotation of the adjuster 126. The detent plate 159 can be positioned between the adjuster 126 and a lower portion 163 of the adjuster passage 124. In addition, the detent plate 159 includes a plurality of notches 166 (see FIG. 5) positioned about an outer circumference 157.

In addition, the adjuster 126 includes a spring passage 160 that houses, at least in part, a spring 162 and a ball 164. The spring 162 biases the ball 164 against one of a plurality of notches 166 (see FIG. 5) situated around the detent plate 159. Rotation of the adjuster 126 results in the ball 164 being moved, against the spring bias, from one notch 166 to another, thereby moving the adjuster 126 and the slide 122 into new positions. In at least some other embodiments, other biasing configurations can be utilized to bias the slide 122 at a desired position.

As discussed, FIG. 7 depicts the adjustable lever assembly 100 in a minimum extent position of the lever 108. The adjuster 126 can be rotated until the termination of the threaded portion 150 of the slide limits further rotations, indicating that an extent has been reached, such as the minimum or a maximum extent. In at least some embodiments, to achieve the minimum extent position, the adjuster 126 is rotated in a clockwise direction 167 about the slide central axis 168. As the adjuster passage 124 is fixed about the lever 108, rotation of the adjuster 126 that utilizes the threaded engagement between the slide 122 and the adjuster 126 serves to move the lever finger contact portion 136 of the lever 108 in a first direction 171 towards the clamp centerline 137. This adjustment serves to decrease the adjust distance 135. Continued rotation of the adjuster 126 in the clockwise direction 167 rotates the lever 108 into the minimum extent position. In the minimum extent position, the grip section 110 is positioned a close distance from the handlebar 105 for a shorter reach by a driver's fingers. In at least one embodiment, in the minimum extent position, the adjust distance 135 is about two inches, while in other embodiments the adjust distance 135 can range from about 1.5 inches to about 2.5 inches. Further, in at least some embodiments, various other configurations, such as barriers formed about the slide 122, can be utilized to provide stops for minimum or maximum extents.

The adjustable lever assembly 100 provides for a reach adjustment from a neutral position to both minimum and maximum extent positions, while maintaining a substantially constant angle $\alpha$ measured between a central pushrod axis 170 extending longitudinally through the pushrod 128 and a central piston axis 172 extending longitudinally through the piston 134. As discussed in greater detail below, maintaining a substantially constant angle between these axes allows for a reach adjustment of the lever 108 that precludes a significant change in the lever ratio. More particularly, in the minimum extent position, in at least one embodiment the angle $\alpha$ is about 0.7 degrees, although in other embodiments the angle $\alpha$ can range from about zero degrees to about six degrees.

Referring now to FIG. 8, a cross-sectional view of the master cylinder lever assembly 104 with the adjustable lever assembly 100 set in a maximum extent position is provided. FIG. 9 depicts an enlarged detail view of a portion of the master cylinder lever assembly 104 of FIG. 8. In at least some embodiments, to achieve the maximum extent position for the lever 108, the adjuster 126 is rotated in a counter-clockwise direction 174 about the slide central axis 168. Rotation of the adjuster 126 utilizes the threaded engagement between the slide 122 and the adjuster 126 to move the lever 108 in a second direction 173 away from the piston 134, thereby increasing the adjust distance 135. In the maximum extent position, the lever 108 is positioned a greater distance from the handlebar 105 for a longer reach by a driver's fingers.

Similar to the minimum extent position adjustment, in the maximum extent position the adjustable lever assembly 100 provides for a substantially constant angle to be maintained between the central pushrod axis 170 and the central piston axis 172. In at least one embodiment, while in a maximum extent position, the angle α between the central pushrod axis 170 and the central piston axis 172 is about 0.7 degrees, while in other embodiments the angle α can range from about zero degrees to about six degrees. In addition, while in the maximum extent position, in at least one embodiment the adjust distance 135 is about three inches while in other embodiments, the adjust distance 135 can range from about 2.7 inches to about 3.5 inches. Further, in at least one embodiment, the angle α is the same whether the lever 108 is extended from the neutral position to either the minimum extent position or the maximum extent position, while in other embodiments, angle α can be varied at these extents.

Figure 10:
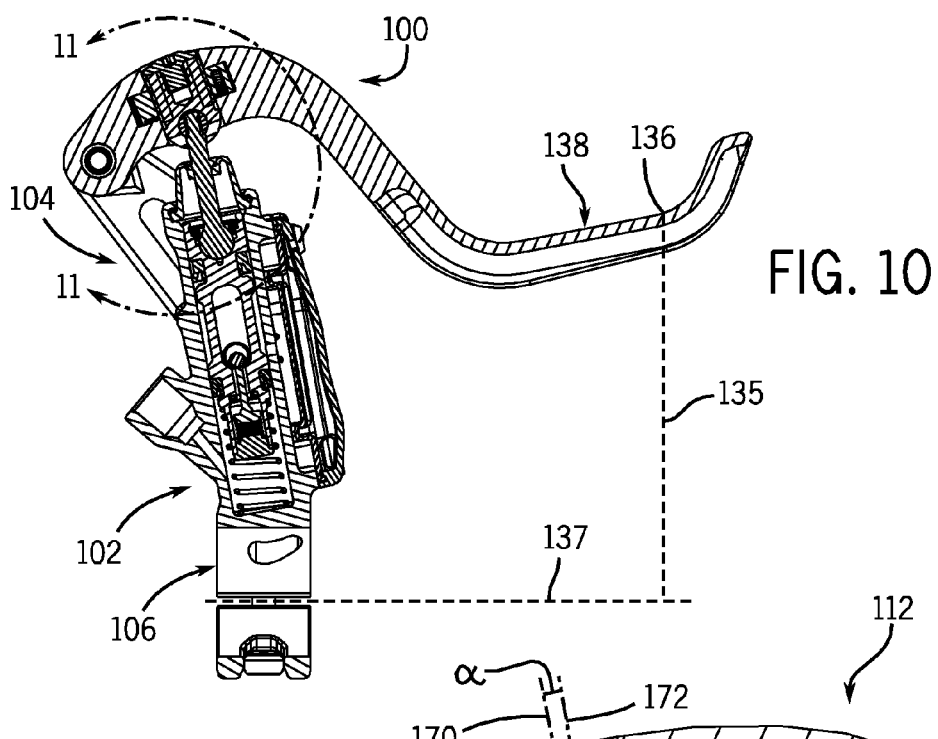
FIG. 10 is a cross-sectional view of the master cylinder lever assembly of FIG. 1, depicting the adjustable lever assembly set in a neutral position, in accordance with at least some embodiments.
Figure 11:
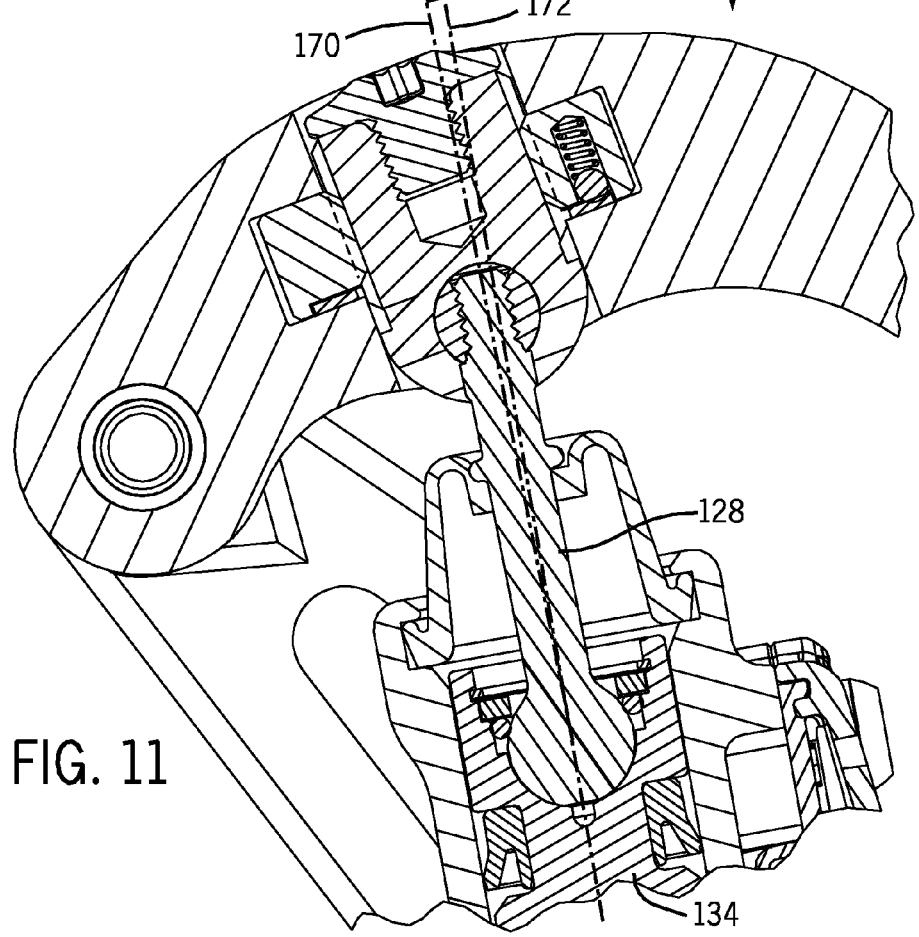
FIG. 11 is an enlarged detail view of a portion of the master cylinder lever assembly of FIG. 10 at 11-11, in accordance with at least some embodiments.

Referring now to FIG. 10, a cross-sectional view of the master cylinder lever assembly 104 with the adjustable lever assembly 100 set in a neutral position is provided. FIG. 11 depicts an enlarged detail view of a portion of the master cylinder lever assembly 104 of FIG. 10. In FIGS. 10 and 11, the lever 108 is shown in the neutral position, which is situated substantially between the minimum and maximum extents. The neutral position provides a central position from which the lever 108 can be adjusted closer or farther from the handlebar 105, thereby changing the adjust distance 135. In at least one embodiment, while in the neutral position, the angle α between the central pushrod axis 170 and the central piston axis 172 is about 1.2 degrees, while in other embodiments the angle α can range from about 0 degrees to about 6 degrees. In addition, while in the neutral position, in at least one embodiment the adjust distance 135 is about 2.5 inches while in other embodiments, the adjust distance 135 can range from about 2.3 inches to about 2.7 inches.

As the lever 108 is adjustable anywhere between the minimum and maximum extents, the angle α varies between the aforementioned ranges for the neutral position and the extent positions. Further, in at least one embodiment, the difference in angle α between the neutral position and either of the minimum and maximum extents is substantially limited to about 0.5 degrees, while in other embodiments the difference in angle α between the neutral position and either of the minimum and maximum extents can range from about 0 degrees to about 2 degrees. The nominal difference in the angle α between the neutral position and either of the minimum and maximum extents provides a significant reach adjustment while maintaining an inconsequential change of the lever ratio.

Notwithstanding the embodiments described above in relation to FIGS. 1-11, it is nevertheless contemplated that various refinements to the features described above, including the addition of various features and components that are commonly employed in conjunction with, or as part of master cylinder lever systems, are included. Various connectors, fasteners, bushings, etc. may be shown in the FIGS. Accordingly, it is specifically intended that the system and method for an adjustable lever assembly not be limited to the embodiments and illustrations contained herein but include modified forms of those embodiments including portions of the embodiments and combinations of elements of different embodiments as come within the scope of the following claims.

I claim:

1. An adjustable lever assembly comprising:
    a master cylinder having a master cylinder fulcrum extending therefrom;
    a lever having an adjustment section and a grip section, wherein the adjustment section includes a slide passage in communication with an adjuster passage, wherein the lever is pivotally secured to the master cylinder fulcrum via a pivot pin that does not extend into the slide passage;
    an adjuster positioned at least partially inside the adjuster passage, the adjuster having a threaded inner passage extending therethrough, wherein the adjuster includes a spring passage for receiving a spring and a ball for biasing the adjuster in a set position;
    a slide positioned substantially inside the slide passage, the slide including an outer wall surface that is keyed to the slide passage and a threaded outer portion for rotatably engaging the threaded inner passage of the adjuster, wherein rotation of the adjuster translates the slide about the adjuster passage, and wherein the slide includes a lower portion secured pivotally to a pushrod; and
    a detent plate positioned adjacent the adjuster the detent plate having an outer circumference that includes a plurality of notches sized to receive at least a portion of the ball therein, and an inner detent passage that is shaped to substantially correspond to the slide wall outer surface to allow for movement of the slide therethrough and to prevent rotation of the detent plate relative to the slide.

2. The adjustable lever assembly of claim 1, further including the pushrod having a fixed length that extends substantially between a center of a pushrod first end and a center of a pushrod second end, wherein the pushrod first end is pivotally secured to the lower portion of the slide and the pushrod includes a central pushrod axis extending longitudinally therethrough.

3. The adjustable lever assembly of claim 2, further including a piston having a central piston axis extending longitudinally therethrough and a piston upper portion, wherein the piston is situated substantially inside a piston bore of the master cylinder and the piston upper portion is in operable communication with the pushrod second end.

4. The adjustable lever assembly of claim 3, wherein the grip section further includes a lever finger contact portion and the master cylinder further includes a clamp having a clamp centerline, wherein the lever is pivotally connected to the master cylinder, and wherein pivoting the lever with respect to the master cylinder via the adjuster and the slide varies an adjust distance that extends from the lever finger contact portion to the clamp centerline.

5. The adjustable lever assembly of claim 4, wherein rotation of the adjuster translates the lever position between a first extent position and a second extent position, with a neutral position situated substantially therebetween, wherein a first angle between the pushrod axis and the piston axis remains substantially constant during translation of the lever between the first extent position, the neutral position, and the second extent position.

6. The adjustable lever assembly of claim 5, wherein a distance between the pushrod and the slide lower portion does not vary during the rotating of the adjuster.

7. The adjustable lever assembly of claim 5, wherein the first angle between the pushrod axis and the piston axis is between about 0.7 degrees and about 1.2 degrees during translation of the lever between the first extent position and the neutral position.

8. The adjustable lever assembly of claim 7, wherein the first angle between the pushrod axis and the piston axis is between about 0.7 degrees and about 1.2 degrees during translation of the lever between the second extent position and the neutral position.

9. The adjustable lever assembly of claim 5, wherein the first angle between the pushrod axis and the piston axis is about 1.2 degrees when the lever is in the neutral position and about 0.7 degrees when the lever is in the first extent or second extent position.

10. The adjustable lever assembly of claim 4, wherein rotation of the adjuster translates the lever position between a first extent position and a second extent position, with a neutral position situated substantially therebetween, and wherein a first angle between the pushrod axis and the piston axis varies by no greater than about 0.5 degrees during translation of the lever between the first extent position and the neutral position.

11. The adjustable lever assembly of claim 4, wherein rotation of the adjuster translates the lever position between a first extent position and a second extent position, with a neutral position situated substantially therebetween, and wherein a first angle between the pushrod axis and the piston axis varies by no greater than about 0.5 degrees during translation of the lever between the second extent position and the neutral position.

12. The adjustable lever assembly of claim 4, wherein rotation of the adjuster translates the lever position between a first extent position and a second extent position with a neutral position situated substantially therebetween, and wherein a first angle between the pushrod axis and the piston axis during translation of the lever between the first extent position and the second position varies by no greater than about 0.5 degrees.

13. An adjustable master cylinder lever assembly comprising:
a master cylinder body including a master cylinder fulcrum;
a lever pivotally secured to the master cylinder fulcrum with a pivot pin, the lever having an adjustment section and a grip section, wherein the grip section includes a lever finger contact portion and the adjustment section includes a slide passage in communication with an adjuster passage;
an adjuster positioned substantially inside the adjuster passage, having an outer surface and a threaded inner passage extending therethrough, wherein the adjuster includes a spring passage for receiving a spring and a ball for biasing the adjuster in a set position;
a piston situated inside the master cylinder body, the piston having a piston upper portion and a central piston axis extending longitudinally through the piston;
a fixed length pushrod having a pushrod first end and a pushrod second end, the pushrod including a central pushrod axis extending longitudinally through the pushrod, wherein the pushrod second end is in operable communication with the piston upper portion;
a slide positioned substantially inside the slide passage and outside the pivot passage, wherein the slide includes an outer wall surface that is keyed to the slide passage to substantially prevent rotation therein, the slide having a threaded outer portion for matingly engaging the threaded inner passage of the adjuster, and a lower portion secured to the pushrod first end, and wherein the master cylinder body includes a clamp having a clamp centerline, wherein rotation of the adjuster varies the distance between the lever finger contact portion and the clamp centerline; and
a detent plate positioned adjacent the adjuster, the detent plate having an outer circumference that includes a plurality of notches sized to receive at least a portion of the ball therein, and an inner detent passage that is shaped to substantially correspond to the slide wall outer surface to allow for movement of the slide therethrough and to prevent rotation of the detent plate relative to the slide.

14. The adjustable lever assembly of claim 13, wherein a first angle between the pushrod axis and the piston axis remains substantially constant as the lever position is adjusted relative to the clamp centerline to extend a distance between a first extent and a second extent.

15. The adjustable lever assembly of claim 13, wherein a first angle between the pushrod axis and the piston axis varies by no greater than about 0.5 degrees as the lever position is adjusted relative to the clamp centerline to extend a distance between a first extent and a second extent.

16. The adjustable lever assembly of claim 13, wherein a first angle between the pushrod axis and the piston axis is limited to between about 0.7 degrees and about 1.2 degrees as the lever position is adjusted relative to the clamp centerline to extend a distance between a first extent and a second extent.

17. An adjustable lever assembly comprising:
a lever having an adjustment section and a grip section, wherein the adjustment section includes a slide passage in communication with and substantially perpendicular to an adjuster passage, wherein the slide passage includes an inner wall surface with an oblong circumference;
a spring biased cylindrical adjuster knob positioned substantially inside the adjuster passage, the adjuster knob including an outer surface protruding at least partially outside the adjuster passage and a threaded inner passage extending therethrough, wherein the adjuster knob includes a spring passage for receiving a spring and a ball for biasing the adjuster knob in a set position;
a slide positioned substantially inside the slide passage, wherein the slide includes a slide outer wall surface that is keyed to the inner wall surface of the slide passage to substantially limit rotation of the slide with respect to the slide passage, the slide including a threaded portion for matingly engaging the threaded inner passage of the adjuster knob and a lower portion that includes a bushing passage;
a pushrod having a longitudinal central pushrod axis and the pushrod is connected to a rotatable bushing situated in the bushing passage, the rotatable bushing including a central bushing axis extending longitudinally, wherein the push rod pivots about the bushing axis; and
a detent plate positioned adjacent the adjuster knob, the detent plate having an outer circumference that includes a plurality of notches sized to receive at least a portion of the ball therein, and an inner detent passage that is shaped to substantially correspond to the slide wall outer surface to allow for movement of the slide therethrough and to prevent rotation of the detent plate relative to the slide.

18. The adjustable lever assembly of claim 17, wherein the pushrod has a fixed length and is in contact with the lower portion of the slide.

19. The adjustable lever assembly of claim 18, further including a piston situated inside a master cylinder body, the piston having a central piston axis extending longitudinally through the piston, wherein the piston is in operable communication with the pushrod, and wherein a first angle between the pushrod axis and the piston axis remains substantially constant as the lever is adjusted between a first extent position and a second extent position.

* * * * *